(12) United States Patent
Adharapurapu

(10) Patent No.: US 12,385,405 B2
(45) Date of Patent: Aug. 12, 2025

(54) WEAR RESISTANT ARTICLE AND METHOD OF MAKING

(71) Applicant: General Electric Company, Schenectady, NY (US)

(72) Inventor: Raghavendra Rao Adharapurapu, Bengaluru (IN)

(73) Assignee: General Electric Company, Evendale, OH (US)

( * ) Notice: Subject to any disclaimer, the term of this patent is extended or adjusted under 35 U.S.C. 154(b) by 51 days.

(21) Appl. No.: 18/298,409

(22) Filed: Apr. 11, 2023

(65) Prior Publication Data

US 2024/0229654 A1   Jul. 11, 2024

(30) Foreign Application Priority Data

Jan. 5, 2023   (IN) .............................. 202311001109

(51) Int. Cl.
| | | |
|---|---|---|
| C22C 45/00 | (2023.01) | |
| C03C 8/18 | (2006.01) | |
| F01D 5/28 | (2006.01) | |

(52) U.S. Cl.
CPC ................ F01D 5/288 (2013.01); C03C 8/18 (2013.01); *C03C 2207/08* (2013.01); *C03C 2214/08* (2013.01); *F05D 2240/303* (2013.01); *F05D 2300/611* (2013.01)

(58) Field of Classification Search
None
See application file for complete search history.

(56) References Cited

U.S. PATENT DOCUMENTS

| | | | |
|---|---|---|---|
| 10,214,824 B2 | 2/2019 | Bogue et al. | |
| 10,626,883 B2 | 4/2020 | Mironets et al. | |
| 11,014,162 B2 | 5/2021 | Hofmann | |
| 11,905,578 B2 | 2/2024 | Hofmann et al. | |
| 2010/0006185 A1* | 1/2010 | Johnson .................. | C22C 45/00 |
| | | | 148/403 |
| 2011/0048587 A1* | 3/2011 | Vecchio .................... | C21D 1/26 |
| | | | 148/403 |
| 2011/0142678 A1 | 6/2011 | Santiago et al. | |
| 2011/0204700 A1 | 8/2011 | Blue et al. | |
| 2015/0314566 A1* | 11/2015 | Poole ....................... | C22C 45/00 |
| | | | 428/614 |

(Continued)

FOREIGN PATENT DOCUMENTS

| | | |
|---|---|---|
| JP | 2017179422 A | 10/2017 |
| WO | WO200694935 A1 | 9/2006 |

OTHER PUBLICATIONS

Deng et al., "The fabrication and property evaluation of Zr—Ti—B—Si thin film metallic glass materials", 2014, Surface & Coatings Technology, vol. 259, pp. 115-122. (Year: 2014).*

(Continued)

*Primary Examiner* — Kim S. Horger
(74) *Attorney, Agent, or Firm* — Dority & Manning, P.A.

(57) ABSTRACT

A wear resistant article including a substrate and a bulk metallic glass coating including an alloy of a base metal, a transition metal, boron, and silicon, wherein the bulk metallic glass coating has a thickness of about 0.05 millimeter or greater and a functionally graded microstructure. A method of producing an article with a wear resistant coating by additively printing a bulk metallic glass coating onto at least a portion of the article.

18 Claims, 4 Drawing Sheets

(56) References Cited

U.S. PATENT DOCUMENTS

| | | | |
|---|---|---|---|
| 2016/0251970 A1 | 9/2016 | Strock et al. | |
| 2018/0363477 A1 | 12/2018 | Hafner et al. | |
| 2019/0001440 A1* | 1/2019 | Zrodowski | B22F 10/36 |
| 2019/0301291 A9 | 10/2019 | Uihlein et al. | |
| 2020/0362879 A1 | 11/2020 | Mironets et al. | |
| 2020/0376809 A1* | 12/2020 | Vogli | B23K 20/24 |
| 2022/0212254 A1* | 7/2022 | Hofmann | B33Y 10/00 |
| 2023/0053703 A1 | 2/2023 | Cho et al. | |
| 2023/0056819 A1 | 2/2023 | Cho et al. | |

OTHER PUBLICATIONS

Basu et al., Bulk Metallic Glasses: A New Class of Engineering Materials, Sadhana, vol. 28, Parts 3 & 4, Jun./Aug. 2003, pp. 783-798.

Frazier, Metal Additive Manufacturing: A Review, Journal of Materials Engineering and Performance, vol. 23, No. 6, 2014, pp. 1917-1928.

Inoue, Bulk Glassy Alloys: Historical Development and Current Research, Advanced Materials and Materials Genome—Review, Engineering, vol. 1, Issue 2, 2015, pp. 185-191.

Mahbooba et al., Additive Manufacturing of an Iron-Based Bulk Metallic Glass Larger Than the Critical Casting Thickness, Applied Materials Today, vol. 11, 2018, pp. 264-269.

Shen et al., Evolution of Crystalline Phase During Laser Processing of Zr—Based Metallic Glass, Journal of Non-Crystalline Solids, vol. 481, 2018, pp. 299-305.

Sohrabi et al., Additive Manufacturing of Bulk Metallic Glasses—Process, Challenges and Properties: A Review, Metals, vol. 11, No. 8, 2021, 59 Pages. https://doi.org/10.3390/met11081279.

Suryanarayana et al., Chapter 3: Glass-Forming Ability of Alloys, Bulk Metallic Glasses, Second Edition, 2018, pp. 45-137. https://doi.org/10.1201/9781315153483.

Williams et al., Laser Processing of Bulk Metallic Glass: A Review, Journal of Materials Processing Technology, vol. 247, 2017, pp. 73-91. https://doi.org/10.1016/j.imatprotec.2017.03.034.

Wrobel et al., A Comprehensive Review of Additive Manufacturing in Construction of Electrical Machines, IEEE Transactions on Energy Conversion, vol. 35, No. 2, Jun. 2020, pp. 1054-1064. https://doi.org/10.1109/TEC.020.2964942.

Xia et al., Calculation of Crystallization Start Line for $Zr_{48}Cu_{45}Al_7$ Bulk Metallic Glass at a High Heating and Cooling Rate, Journal of Alloys and Compounds, vol. 484, Issues 1-2, 2009, pp. 698-701. https://doi.org/10.1016/j.jallcom.2009.05.019.

Zhang et al., Additive Manufacturing of Functionally Graded Materials: A Review, Materials Science & Engineering: A, vol. 764, Sep. 2019, 138209. https://doi.org/10.1016/j.msea.2019.138209.

* cited by examiner

WEAR RESISTANT ARTICLE AND METHOD OF MAKING

PRIORITY INFORMATION

The present application claims priority to Indian Patent Application Number 202311001109 filed on Jan. 5, 2023.

FIELD

The present disclosure relates to wear resistant articles and their methods of making via additively printing.

BACKGROUND

The operating environment within a gas turbine engine is both thermally and chemically hostile. High temperature iron, nickel and cobalt-based superalloys have been developed for engine components. In addition, titanium alloys are also used for particular applications, such as the leading edges of composite fan blades. Components formed from such alloys often cannot withstand long service exposures if located in certain sections of a gas turbine engine, such as the turbine and/or combustor sections. Hot corrosion of gas turbine engine components generally occurs when sulfur compounds and/or dust attacks the components' surfaces. Sources of sulfur compounds include fuel and ingestion from environment. Dust predominately comes from environment ingestion. The presence of corrosive compounds and/or dust is responsible for corrosion of hot section components like compressors and/or disks.

Current erosion and wear coatings are predominantly ceramic metal composites (cermets). However, cermet coatings have moderate strength and low ductility. Moreover, they are applied via line-of-sight processes, which are limited to non-complex, external surfaces. In addition, current metallic glass coatings are typically thin films. Therefore, improved anti-corrosion coatings are needed.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
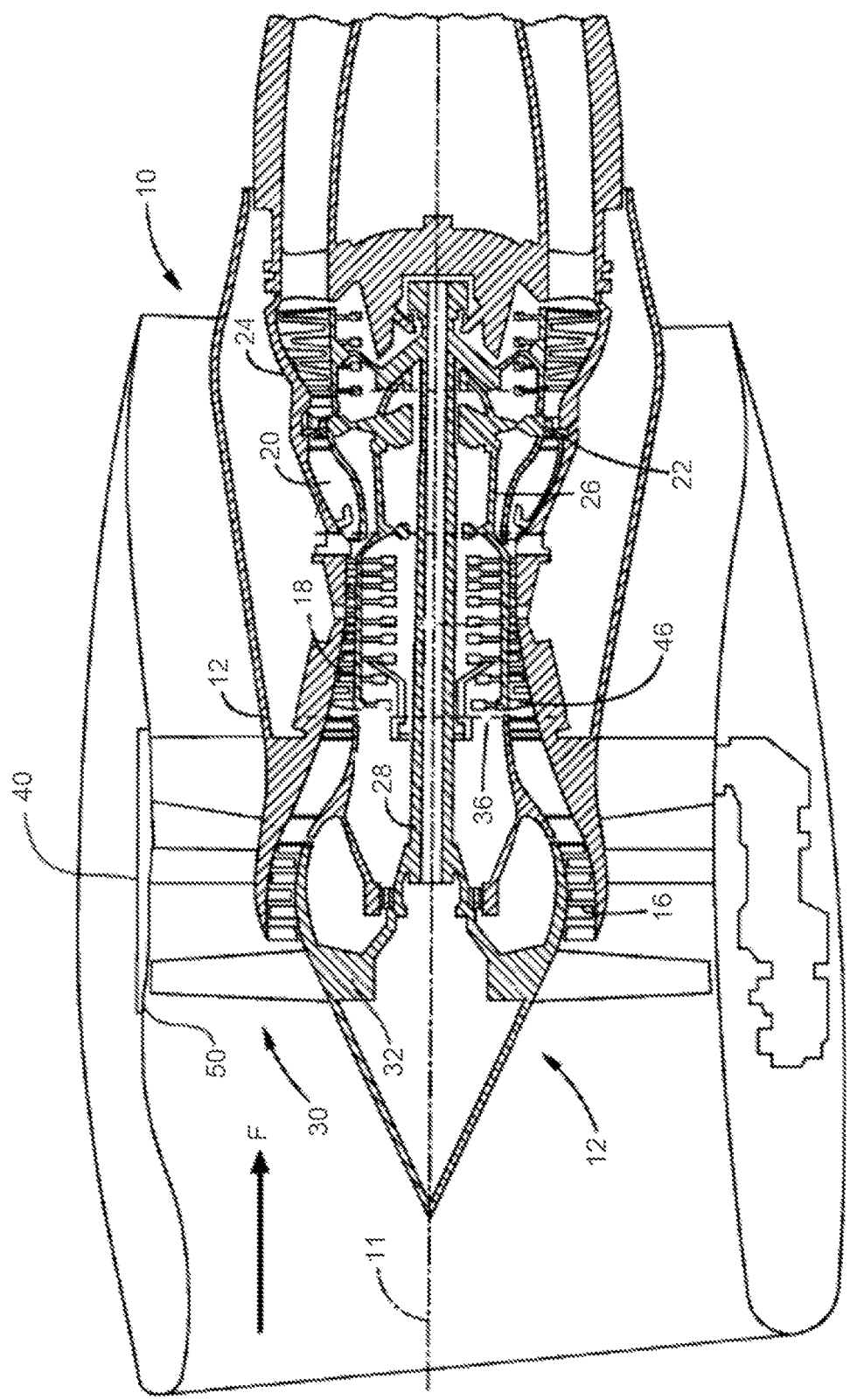
FIG. 1 is a schematic, cross-sectional view of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

Wear resistant articles are generally provided, along with methods of their formation via additive manufacturing processes. The wear resistant article generally includes a substrate and a bulk metallic glass coating. The bulk metallic glass coating includes an alloy of a base metal, a transition metal, boron, and silicon. The bulk metallic glass coating has a thickness of 50 micrometers ($\mu$m) or greater and a functionally graded microstructure. In one embodiment, the method includes additively printing a bulk metallic glass coating onto at least a portion of the article. The bulk metallic glass coating incudes an alloy of a base metal, a transition metal, boron, and silicon. The bulk metallic glass coating has a thickness of 50 $\mu$m or greater.

As noted above, iron, nickel and cobalt-based superalloys have been developed for engine components subjected to high temperatures. In addition, titanium alloys have been used for the leading edges of composite fan blades. These alloys are subjected to foreign object damage (FOD) such as sand, dust, bird strikes, hail stones as well as erosion from moisture. To improve the wear-resistance and service-life of these engine components inexpensive bulk metallic glass alloy compositions including, for example, Ti-TM-B—Si, Fe-TM-B—Si, Ni/Co-TM-B—Si, Al-TM-B—Si (where "TM" refers to a transition metal or mixture of transition metals) may be additively printed on to surface thereof, such as on the leading edge thereof.

Referring now to the drawings, wherein identical numerals indicate the same elements throughout the figures, FIG. 1 provides a schematic, cross-sectional view of a gas turbine engine 10 that includes a propulsion apparatus. While the illustrated example is a high-bypass turbofan engine, the principles of the present disclosure are also applicable to other types of engines, such as low-bypass turbofans, turbojets, turboprops, etc. The engine 10 has a longitudinal center line or axis 11. As used herein, the terms "axial" and "longitudinal" both refer to a direction parallel to the center-line axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 12, booster 16, compressor 18, combustor 20, high pressure turbine or "HPT" 22, and low-pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 12 and booster 16 via an inner shaft 28.

The fan 12 is one example of a propulsion apparatus. It will be understood that the principles described herein are applicable to other kinds of propulsion apparatus operable to produce propulsive thrust, such as ducted propellers or compressors. Instead of a gas turbine engine, the fan 12 or other propulsion apparatus could be driven by another type of prime mover such as: heat engines, motors (e.g. electric, hydraulic, or pneumatic), or combinations thereof (for example electric hybrid drivetrains). The propulsion apparatus may be driven directly by a prime mover, or through an intermediate geartrain.

Figure 2:
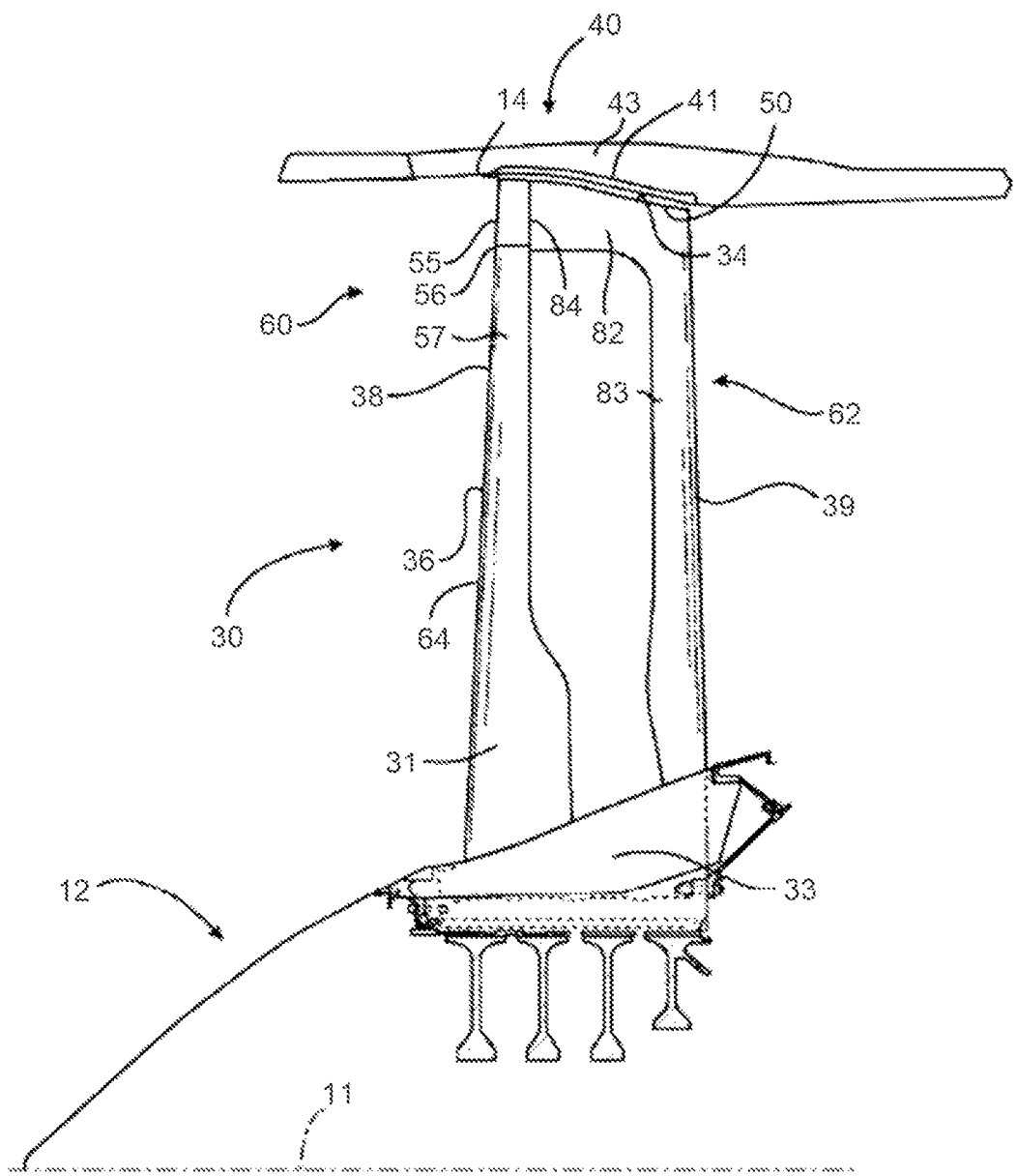
FIG. 2 is an enlarged view of a portion of the exemplary gas turbine engine of FIG. 1, showing a fan blade and a portion of a fan hub and shroud where a wear resistant coating may be located according to exemplary embodiments of the present disclosure.

Referring to FIG. 2, fan 12 includes a plurality of fan blades 30. The fan blades 30 are mounted to a fan disk 32 (shown in FIG. 1) that extends from a root 33 to a tip 34 and defines a length L. Additionally, each fan blade 30 includes a pressure side 35, a suction side 36, and reinforcement that includes a leading edge 38, and a trailing edge 39.

As shown in FIG. 2, the fan casing 40 includes an inner annular surface 50. The inner annular surface 50 has a generally circular cross-section and defines an inner diameter of the inner casing 40. The inner annular surface 50 is configured to channel the incoming air through the fan 12 (FIG. 1) to ensure that the fan 12 (FIG. 1) will compress the bulk of the air entering the engine 10. By way of example and not limitation, the fan casing 40 can be made of the following: a metal, a composite material, and a combination thereof.

The inner casing 40 includes a thin layer of shroud material 41 positioned adjacent to a blade tip path defined by the blades 30 of the fan 12. The shroud material 41 is supported by a containment structure 43. According to the illustrated embodiment, the containment structure 43 is generally solid and is not configured as a honeycomb structure or as other trench filler material such as that found in a conventional fan casing. Instead, the casing 40 consists essentially of a solid metal containment structure 43 and the shroud material 41.

A small radial gap 14 is present between the tips 34 of the fan blades 30 and the inner annular surface 50. It is this clearance, i.e., the radial gap 14, that is minimized in order to promote the efficiency of the engine 10.

The airfoil body 31 is made from a composite material, defined herein as a material including two or more distinct materials combined into one structure, for example a matrix having reinforcing fibers embedded therein. One example of a composite system suitable for use in aerospace applications includes an epoxy matrix with carbon fiber reinforcement.

In addition to the composite material, the fan blade 30 also incorporates at least one cladding element. In the specific example shown in FIG. 2, the cladding elements comprise a leading edge guard 60 and a tip cap 62.

The leading edge guard 60 is attached to the body 31 to define the leading edge 38. The leading edge guard 60 provides the fan blade 30 with additional impact resistance, erosion resistance, and improved resistance of the composite structure to delamination.

Figure 4:
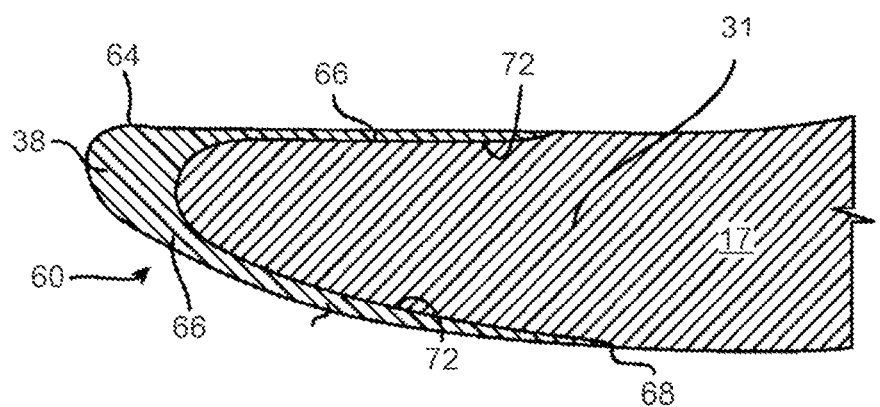
FIG. 4 is a cross-sectional view of a leading edge of the blade where a wear resistant coating may be located according to exemplary embodiments of the present disclosure.

As best seen in FIG. 4, the leading edge guard 60 includes a tip portion 55, i.e., a tip region, and a body portion 57, i.e., a body region, that meet at a boundary 56. The leading edge guard 60 further comprises a nose 64 with a pair of wings 66 extending aft therefrom. The wings 66 taper in thickness as they extend away from the nose 64. Exterior surfaces of the nose 64 and the wings 66 collectively define an exterior surface of the leading edge guard 60. The shape and dimensions of the exterior surfaces of the nose 64 and the wings 66 are selected to act as an aerodynamic extension of the airfoil body 31. Stated another way, the exterior shape of the blade 30 is defined in part by the airfoil body 31 and in part by the leading edge guard 60. The leading edge guard 60 may be attached to the airfoil body 31 with a known type of adhesive.

The tip portion 55 and the body portion 57 define interior surfaces of the nose 64 and wings 66 that collectively define an interior surface 72 of the leading edge guard 60. The shape and dimensions of the interior surface 72 are selected to closely fit the exterior of the airfoil body 31.

The body portion 57 of the leading edge guard 60 is made from a first material that may be a metal alloy of a composition providing desired strength and weight characteristics. Non-limiting examples of suitable metal alloys for construction of the leading edge guard 60 include titanium-based alloys and superalloys, nickel-based alloys and superalloys, and iron-based alloys and superalloys. The body portion 57 of the leading edge guard may also be made of a nonmetallic material.

The tip portion 55 of the leading edge guard 60 is made from a second material that may be a metal alloy of a composition providing desired strength and weight characteristics. Non-limiting examples of suitable alloys for construction of the leading edge guard 60 include titanium-based alloys and superalloys, nickel-based alloys and superalloys, and iron-based alloys and superalloys. The leading edge guard 60 may also be made of a nonmetallic material.

Figure 3:
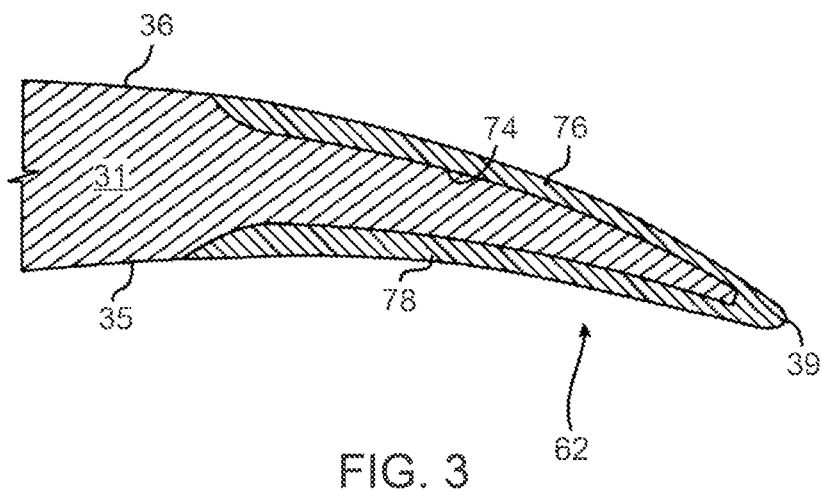
FIG. 3 is a cross-sectional view of a trailing edge of a blade where a wear resistant coating may be located according to exemplary embodiments of the present disclosure.

Referring now to FIGS. 2 and 3, the tip cap 62 overlies portions of the pressure and suction sides 35, 36 that are adjacent to the tip 34. The tip cap 62 provides additional impact protection, as well as stiffens the airfoil body 31 along the tip 34 and the trailing edge 39. The tip cap 62 includes a pair of side walls 76 and 78. The exterior surfaces of the side walls 76 and 78 collectively define an exterior surface of the tip cap 62. The shape and dimensions of the exterior surface are selected to act as an aerodynamic extension of the airfoil body 31. Stated another way, the exterior shape of the blade 30 is defined in part by the airfoil body 31 and in part by the tip cap 62. The tip cap 62 may be attached to the airfoil body 31 with a known type of adhesive.

Interior surfaces of the side walls 76 and 78 collectively define an interior surface 74 of the tip cap 62. The shape and dimensions of the interior surface 74 are selected to closely fit the exterior of the airfoil body 31.

Continuing to refer to FIG. 2, the tip cap 62 includes a tip portion 82 and a trailing edge portion 83. The two portions 82 and 83 roughly define an L-shape. An upper forward edge 84 of the tip cap 62 abuts the leading edge guard 60.

The tip cap 62 may be made from a metal alloy of a composition providing desired strength and weight characteristics. Non-limiting examples of suitable alloys for construction of the tip cap 62 include titanium-based alloys and superalloys, nickel-based alloys and superalloys, and iron-based alloys and superalloys.

Figure 5:
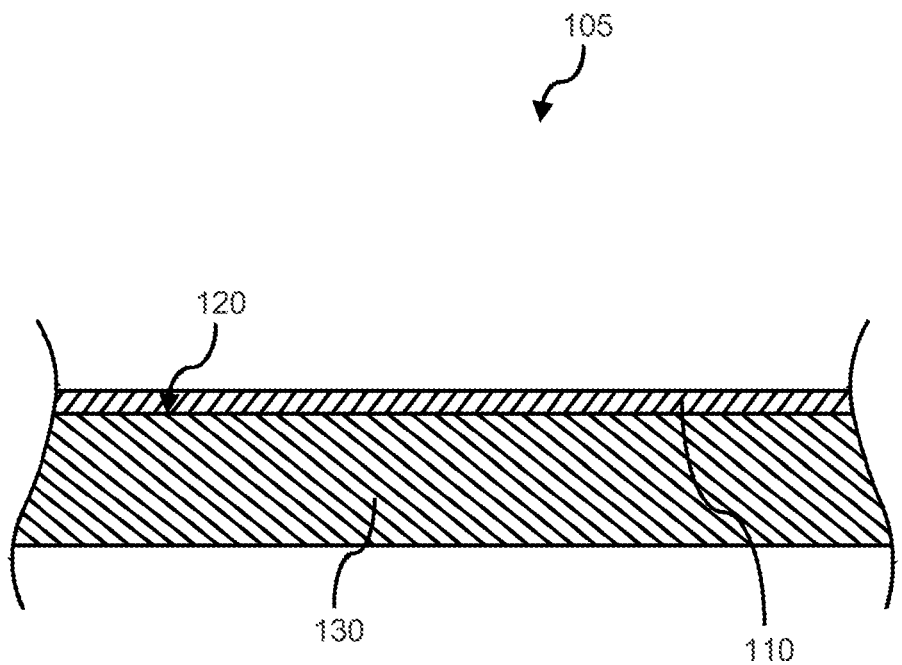
FIG. 5 is a cross-sectional representation of a wear resistant coating applied to a substrate component according to exemplary embodiments of the present disclosure.

FIG. 5 depicts, in cross-section, the coating of the present disclosure deposited on an engine component to form a wear resistant article 105. Wear resistant coating 110 is deposited on the surface 120 of a substrate 130 to define the wear resistant article 105. The wear resistant article 105 may be any component used in a gas turbine engine, such as a turbine engine disks, blades, and/or retainers as described hereinabove. The surface 120 can be any surface of an engine component 105. The substrate 130 may comprise a superalloy based on titanium, nickel, cobalt, iron or a combination thereof.

As discussed above, the wear resistant article 105 of the present disclosure includes a bulk metallic glass coating 110 on a substrate. In certain embodiments, the substrate is made of titanium, aluminum, iron, nickel, cobalt, niobium, chromium, molybdenum, tantalum, tungsten, rhenium, or an alloy thereof (including superalloys thereof). In one embodiment, the substrate is made of titanium or an alloy thereof (including superalloys thereof). In an embodiment, the substrate is a leading edge of a fan blade of a jet engine.

Bulk metallic glass is a solid metallic material with an amorphous (disordered) atomic structure, as compared to convention metal materials which have an ordered crystalline atomic structure. Unlike conventional glass materials, bulk metallic glasses are good electrical conductors. Bulk metallic glasses provide high strength (on the order of about 1 to 4 gigapascals) and good ductility (e.g., 1% to 5%). This combination provides strong coatings with resistance to fracture. In addition, bulk metallic glasses are generally corrosion resistant. Accordingly, the bulk metallic glass coating provides an advantageous combination of strength, long life, and wear resistance.

In certain embodiments, the bulk metallic glass of the present disclosure is an alloy including a base metal (M), a transition metal (TM), boron (B), and silicon (Si)

$$M-TM-B-Si.$$

In an embodiment, the base metal is titanium, aluminum, iron, nickel, or cobalt or a combination thereof. In an embodiment, the base metal is titanium.

In certain embodiments, the transition metal may be any known transition metal(s). In one embodiment, the transition metal is vanadium, chromium, manganese, iron, cobalt, nickel, zirconium, niobium, molybdenum, ruthenium, rhodium, tungsten, hafnium, tantalum, tungsten, or rhenium, or a combination thereof. In certain embodiments, the transition metal is molybdenum, zirconium, palladium, or tungsten, or a combination thereof. In certain embodiments of the present disclosure, the transition metal is present in an amount of 0.1% to 15% by weight, or 0.5% to 10% by weight, or 1% to 5% by weight based on the total weight of the bulk metallic glass. Without wishing to be bound by any particular theory, it is believed that this amount of transition metal allows for the formation of particles of transition metal borides and/or silicides in the bulk metallic glass coating while still allowing for the ductile metal matrix to remain substantially continuous.

In certain embodiments of the present disclosure, the boron is present in an amount of 1% to 5% by weight, or 1.5% to 4% by weight, or 2% to 3% by weight based on the total weight of the bulk metallic glass. In certain embodiments of the present disclosure, the silicon is present in an amount of 1% to 10% by weight, or 2% to 7.5% by weight, or 3 to 5% by weight based on the total weight of the bulk metallic glass coating. Without wishing to be bound by any particular theory, it is believed that this amount of boron and the silicon allows for the formation of particles of transition metal borides and/or silicides in the bulk metallic glass coating, which have very high hardness.

In certain embodiments of the present disclosure, the borides and/or silicides particles are present in an amount of 0.5% to 20% by weight, or 1% to 10% by weight, or 2% to 5% by weight based on the total weight of the bulk metallic glass coating. Thus, in an embodiment, the bulk metallic glass coatings take the form of transition metal boride and/or silicide particles interspersed in a ductile metal matrix. The bulk metallic coatings may have a functionally graded microstructure. As used herein, "functionally graded microstructure" means that the metallic glass coating has areas of hard particles trapped or suspended in a metal matrix continuous phase, which is more ductile. These alternating hard and ductile areas produce a material that, as discussed above, is both strong and wear resistant. Moreover, the surface may also be provided with a pattern in which some areas have great hardness and other have greater ductility to provide the same combination of strength and wear resistance. Such a pattern may be formed by controlling/varying the amount of transition metal borides and/or silicides supplied to particular areas (e.g., decreasing the amount of transition metal borides and/or silicides in certain areas while increasing the amount of transition metal borides and/or silicides in other areas). Such patterns may be formed by additive manufacturing technologies.

Additive manufacturing technologies may generally be described as technologies for building objects point-by-point or layer-by-layer, typically in a vertical direction. Other methods of fabrication are contemplated and within the scope of the present disclosure. For example, although the discussion herein refers to the addition of material to form successive layers or point-by-point addition, the presently disclosed subject matter may be practiced with any additive manufacturing technology or other manufacturing technology, including layer-additive processes, layer-subtractive processes, or hybrid processes. Additive printing encompasses a variety of technologies for producing components in an additive, point-by-point fashion. In powder bed fusion, a focused energy beam is used to fuse powder particles together. The energy beam may be either an electron beam or laser. Laser powder bed fusion processes are referred to in the industry by many different names, the most common of which being selective laser sintering (SLS) and selective laser melting (SLM), depending on the nature of the powder fusion process. When the powder to be fused is metal, the terms direct metal laser sintering (DMLS) and direct metal laser melting (DMLM) are commonly used.

The bulk metallic glass coating is described above in detail. In an embodiment of the present disclosure, a bulk metallic glass coating is additively printed onto at least a portion of an article. In general, a powder containing the base metal, the transition metal, boron, and silicon is deposited on the surface of the substrate and successive portions of the powder are then fused to form the bulk metallic glass coating.

Metallic glasses are formed by rapidly cooling (e.g., at a rate higher than the critical cooling rate), which prevents ordered crystalline structures from forming during solidification. As used herein, the term "critical cooling rate" means that rate of cooling of the alloy that delineates between the formation of metallic glass and conventional crystalline metal. Thus, if the alloy is cooled at a rate greater that the critical cooling rate it will form a metallic glass. On the other hand, if the alloy is cooled at a rate less that the critical cooling rate it will form a conventional crystalline metal. This a localized effect and there may be areas of metallic glass adjacent to areas of convention crystalline metal dues to local cooling. Moreover, there may be areas of transition between the two structures which exhibit features of each.

In an embodiment, the bulk metallic glass coating is subjected to further heat treatment, such as annealing, to produce particles of transition metal borides and/or silicides, which have very high hardness. In an embodiment, the heat treatment is the local heating of the bulk metallic glass coating to a temperature of 300° C. to 600° C. (such as 300° C. to 500° C.). In certain embodiments, the heat treatment can be carried out during initial manufacturing or may be carried out at a later time, for example, when the article has been assembled into an end product. In certain embodiments of the present disclosure, the boride and/or silicide particles are present in an amount of 0.5% to 20% by weight, or 1% to 10% by weight, or 2% to 5% by weight based on the total weight of the bulk metallic glass coating.

In certain embodiments of the present disclosure the bulk metallic glass coating has a thickness of 50 μm to 20 millimeters, or 500 μm to 10 millimeters, or 1 millimeter to 5 millimeters.

The additive printing processes employed in the embodiments of the method of the present description also allow flexibility in producing the bulk metallic glass coatings. The point-by-point additive processes described herein allow for the deposition of coatings on the surface of substrates with complex geometries. Moreover, these processes allow for fine tuning the thickness of the coating across the surface of the substrate to provide, for example, greater thickness in some areas (e.g., for greater protection) and less thickness in other areas (e.g., for less bulk). Furthermore, the additive printing process makes it possible to use the bulk metallic glass coatings to repair defects or damage to the substrate by additively printing the bulk metallic glass coating only where needed to fill in the void left by the defect or damage. In certain embodiments, the additive printing may be used to produce a coating surface with a pattern of various hard and ductile areas.

Further aspects are provided by the subject matter of the following clauses:

A wear resistant article comprising: a substrate; and a bulk metallic glass coating comprising an alloy of a base metal, a transition metal, boron, and silicon, wherein the bulk metallic glass coating has a thickness of 50 μm or greater and a functionally graded microstructure.

The wear resistant article of one or more of these clauses, the substrate comprising a metal selected from the group consisting of titanium, aluminum, iron, nickel, cobalt, niobium, chromium, molybdenum, tantalum, tungsten, rhenium, and alloys thereof.

The wear resistant article of one or more of these clauses, the substrate comprising titanium or an alloy thereof.

The wear resistant article of one or more of these clauses, wherein the substrate is a leading edge of a fan blade of a jet engine.

The wear resistant article of one or more of these clauses, wherein the base metal is titanium and the transition metal is selected from the group consisting of vanadium, chromium, manganese, iron, cobalt, nickel, zirconium, niobium, molybdenum, ruthenium, rhodium, tungsten, hafnium, tantalum, rhenium, and alloys thereof.

The wear resistant article of one or more of these clauses, wherein the base metal is titanium and the transition metal is selected from the group consisting of molybdenum, zirconium, palladium, tungsten, and alloys thereof.

The wear resistant article of one or more of these clauses, the bulk metallic glass coating comprising: 0.1% to 15% of the transition metal, 1 to 5% boron, and 1 to 10% silicon.

The wear resistant article of one or more of these clauses, wherein the bulk metallic glass coating has a thickness between 50 μm and 20 millimeters.

The wear resistant article of one or more of these clauses, wherein the bulk metallic glass coating has a thickness between 1 millimeter and 10 millimeters.

The wear resistant article of one or more of these clauses, wherein the functionally graded microstructure comprises 0.5% to 20% by weight of hard particles dispersed within an amorphous matrix of the bulk metallic glass coating.

The wear resistant article of one or more of these clauses, wherein the hard particles comprise borides, silicides, or a combination thereof.

A method of producing an article with a wear resistant coating, the method comprising additively printing a bulk metallic glass coating onto at least a portion of the article, the bulk metallic glass coating comprising an alloy of a base metal, a transition metal, boron, and silicon, wherein the bulk metallic glass coating has a thickness of 50 μm or greater.

The method of one or more of these clauses, wherein the portion of the article being coated comprises a metal selected from the groups consisting of titanium, aluminum, iron, nickel, cobalt, niobium, chromium, molybdenum, tantalum, tungsten, rhenium, and alloys thereof.

The method of one or more of these clauses, wherein the portion of the article being coated comprises titanium or an alloy thereof.

The method of one or more of these clauses, wherein the portion of the article being coated is a leading edge of a fan blade of a jet engine.

The method of one or more of these clauses, wherein the base metal is titanium and the transition metal is selected from the group consisting of vanadium, chromium, manganese, iron, cobalt, nickel, zirconium, niobium, molybdenum, ruthenium, rhodium, palladium, and tungsten, and alloys thereof.

The method of one or more of these clauses, wherein the base metal is titanium and the transition metal is selected from the group consisting of molybdenum, zirconium, palladium, and tungsten, and alloys thereof.

The method of one or more of these clauses, the bulk metallic glass coating comprising: 0.1% to 15% of the transition metal, 1 to 5% boron, and 1 to 10% silicon.

The method of one or more of these clauses, wherein the bulk metallic glass coating has a thickness between 50 μm and 20 millimeters.

The method of one or more of these clauses, wherein the bulk metallic glass coating has a thickness between 1 millimeter and 10 millimeters.

The method of one or more of these clauses, further comprising annealing the bulk metallic glass coating to form a functionally graded microstructure in the coating.

The method of one or more of these clauses, wherein the functionally graded microstructure comprises 1% to 20% boride or silicide hard particles dispersed within an amorphous matrix of the bulk metallic glass coating.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A wear resistant article, comprising:
   a substrate; and
   a bulk metallic glass coating comprising an alloy of titanium that includes 0.1% to 15% by weight of a transition metal, 2% to 3% by weight boron, and 3% to 5% by weight silicon, wherein the bulk metallic glass coating has a thickness of 50 μm or greater and a functionally graded microstructure.

2. The wear resistant article of claim 1, wherein the substrate comprises a metal selected from the group consisting of titanium, aluminum, iron, nickel, cobalt, niobium, chromium, molybdenum, tantalum, tungsten, rhenium, and alloys thereof.

3. The wear resistant article of claim 1, wherein the substrate comprises titanium or an alloy thereof.

4. The wear resistant article of claim 1, wherein the substrate is a leading edge of a fan blade of a jet engine.

5. The wear resistant article of claim 1, wherein the transition metal is selected from the group consisting of vanadium, chromium, manganese, iron, cobalt, nickel, zirconium, niobium, molybdenum, ruthenium, rhodium, tungsten, hafnium, tantalum, rhenium, and alloys thereof.

6. The wear resistant article of claim 1, wherein the transition metal is selected from the group consisting of molybdenum, zirconium, palladium, tungsten, and alloys thereof.

7. The wear resistant article of claim 1, wherein the bulk metallic glass coating has a thickness between 50 μm and 20 millimeters.

8. The wear resistant article of claim 1, wherein the bulk metallic glass coating has a thickness between 1 millimeter and 10 millimeters.

9. The wear resistant article of claim 1, wherein the functionally graded microstructure comprises 0.5% to 20% by weight of hard particles dispersed within an amorphous matrix of the bulk metallic glass coating, wherein the hard particles comprise borides, silicides, or a combination thereof.

10. A method of producing an article with a wear resistant coating, the method comprising:
    additively printing a bulk metallic glass coating onto at least a portion of the article, wherein the bulk metallic glass coating comprises an alloy of titanium that includes 0.1% to 15% by weight of a transition metal, 2% to 3% by weight boron, and 3% to 5% by weight silicon, and wherein the bulk metallic glass coating has a thickness of 50 μm or greater and a functionally graded microstructure.

11. The method of producing the article with the wear resistant coating of claim 10, wherein the portion of the article being coated comprises a metal selected from the group consisting of titanium, aluminum, iron, nickel, cobalt, niobium, chromium, molybdenum, tantalum, tungsten, rhenium, and alloys thereof.

12. The method of producing the article with the wear resistant coating of claim 10, wherein the portion of the article being coated comprises titanium or an alloy thereof.

13. The method of producing the article with the wear resistant coating of claim 10, wherein the portion of the article being coated is a leading edge of a fan blade of a jet engine.

14. The method of producing the article with the wear resistant coating of claim 10, wherein the transition metal is selected from the group consisting of vanadium, chromium, manganese, iron, cobalt, nickel, zirconium, niobium, molybdenum, ruthenium, rhodium, palladium, tungsten, and alloys thereof.

15. The method of producing the article with the wear resistant coating of claim 10, wherein the transition metal is selected from the group consisting of molybdenum, zirconium, palladium, tungsten, and alloys thereof.

16. The method of producing the article with the wear resistant coating of claim 10, wherein the bulk metallic glass coating has a thickness of 50 μm and 20 millimeters.

17. The method of producing the article with the wear resistant coating of claim 10, further comprising:
    annealing the bulk metallic glass coating to form the functionally graded microstructure in the coating.

18. The method of producing the article with the wear resistant coating of claim 17, wherein the functionally graded microstructure comprises 1% to 20% by weight boride or silicide hard particles dispersed within an amorphous matrix of the bulk metallic glass coating.

* * * * *